United States Patent [19]

Schwarz

[11] Patent Number: 4,659,300
[45] Date of Patent: Apr. 21, 1987

[54] WORM EXTRUDER FOR SYNTHETIC RESIN

[75] Inventor: Wilfried Schwarz, Königswinter, Fed. Rep. of Germany

[73] Assignee: Reifenhauser GmbH & Co. Maschinenfabrik, Troisdorf, Fed. Rep. of Germany

[21] Appl. No.: 807,770

[22] Filed: Dec. 10, 1985

Related U.S. Application Data

[63] Continuation of Ser. No. 618,195, Jun. 7, 1984, abandoned.

[30] Foreign Application Priority Data

Jun. 9, 1983 [DE] Fed. Rep. of Germany ....... 3320782

[51] Int. Cl.⁴ .............................................. B29C 47/00
[52] U.S. Cl. ................... 425/113; 264/176.1; 264/349; 366/89; 366/323; 425/131.1; 425/190; 425/208

[58] Field of Search ................... 264/176 R, 349, 211; 366/76, 89, 90, 322, 323, 136, 137; 425/205, 208, 113, 131.1, 190, 376 R, 576, DIG. 243, 4, 168

[56] References Cited

U.S. PATENT DOCUMENTS

| | | | |
|---|---|---|---|
| 3,198,142 | 8/1965 | Lothes | 366/136 |
| 3,647,329 | 3/1972 | Reifenhauser et al. | 425/4 |
| 3,850,415 | 11/1974 | Hansen | 366/89 |
| 3,910,316 | 10/1975 | Reifenhauser | 425/131.1 |
| 4,227,870 | 10/1980 | Kim | 425/205 |
| 4,308,998 | 1/1982 | Wood | 366/137 |

Primary Examiner—Jay H. Woo
Assistant Examiner—Timothy W. Heitbrink
Attorney, Agent, or Firm—Karl F. Ross; Herbert Dubno

[57] ABSTRACT

A synthetic resin worm press in which the thread height in an intake zone adjoining a feed opening zone is substantially smaller than the thread height in the feed opening zone, a frustoconical divergent transition piece is provided between the two zones at the core of the worm and longitudinal grooves are formed in the wall of the bore along these zones and are of progressively decreasing depth in the flow direction of the material.

10 Claims, 4 Drawing Figures

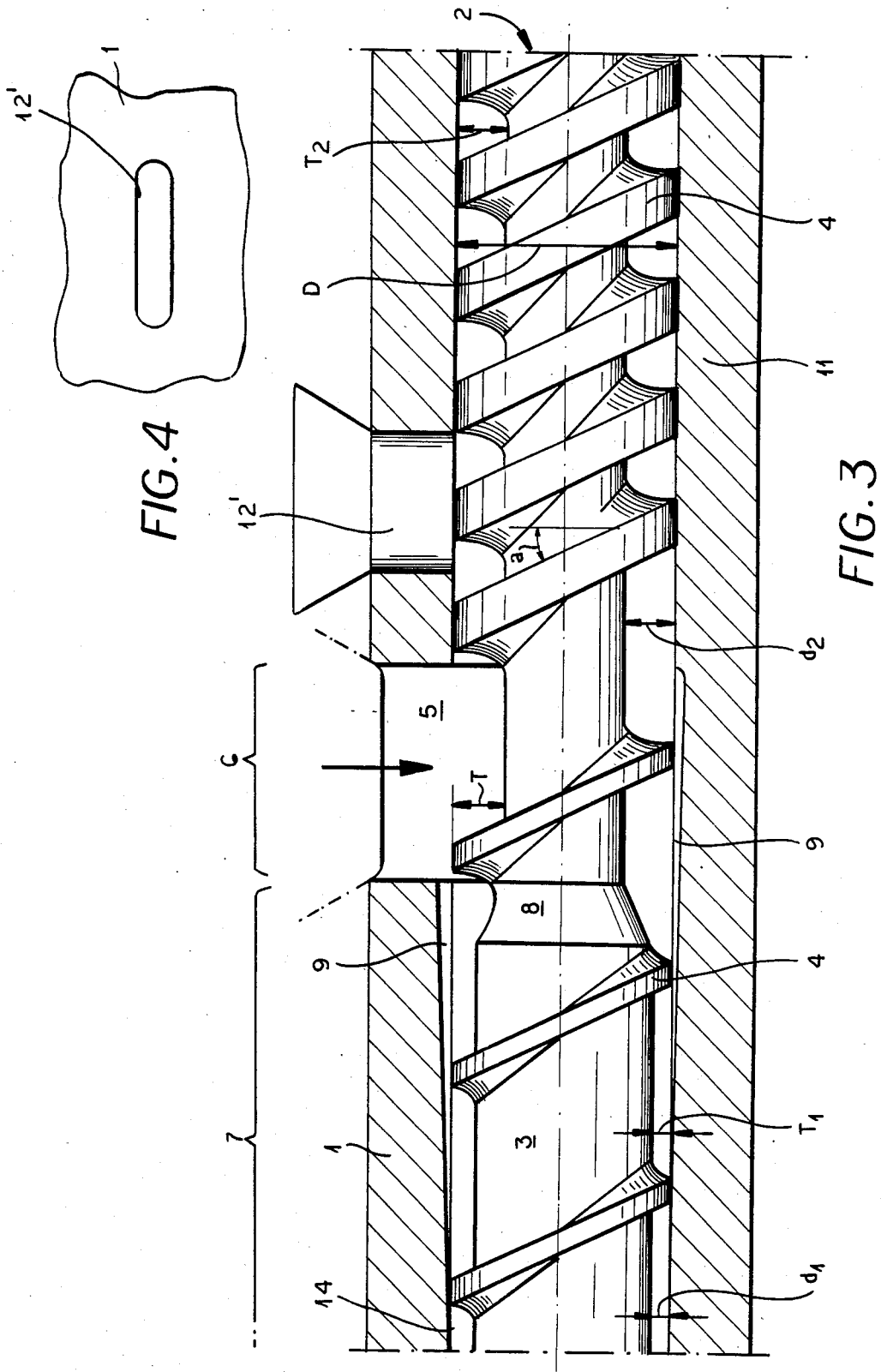

WORM EXTRUDER FOR SYNTHETIC RESIN

This is a continuation of co-pending application Ser. No. 618,195 filed on June 7, 1984, now abandoned.

FIELD OF THE INVENTION

My present invention relates to a worm extruder for synthetic resin, more particularly, to a synthetic resin extrusion press of the type having a cylindrical housing and a worm rotatable in this housing and capable of entraining synthetic resin material, e.g. a pulverulent thermoplastic synthetic resin, from an inlet (e.g. a hopper), subjecting the synthetic resin material to mastication, compression, shear action and intimate mixing so as to liquify or plastify this synthetic resin, and discharging the latter at the end of the extrusion cylinder as a flowable material which can be shaped.

BACKGROUND OF THE INVENTION

Synthetic resin worm or screw presses of the aforedescribed type are known and include the systems described in the following U.S. Pat. Nos. 3,647,329 and 3,910,316.

Such synthetic resin worm presses, as noted, comprise a generally cylindrical housing and a worm rotatable in this housing and comprising a driven worm shaft formed with or constituting the worm core from which at least one worm or screw thread, also called a rib or flight, rises.

The thread height and the pitch angle of the thread varies along the length of the worm so that different degrees of compression and shearing action may be applied to the material and thus different zones of the worm subject the material to different processing parameters.

In general, a filling opening communicates laterally with the worm cylinder through a wall of the housing and this zone can be referred to as a feeding zone. Adjacent the feeding zone in the direction of displacement of the worm is an intake zone in which the synthetic resin material which passes into the worm cylinder in the intake zone is entrained by the flight or thread and forced to move along the length of the worm.

In general, the thread or flight in the intake zone and in the feed opening zone have the same pitch angle. The pitch angle in the intake zone, however, can be larger.

In conventional synthetic worm presses (see Schenkel: *Kunststoff-Extrudertechnik*, 1963, page 171, issue 5/72), the thread or flight not only in the feed opening zone but also in the region of the intake zone has an increased thread height (or depth) as measured from the crest of the thread along a radius of the worm to the root, i.e. the thread height T is equal to one half the difference between the diameter of the worm D less the root diameter d of the worm. The root diameter of the worm, i.e. the diameter of the core is also the same in the feed opening zone and the intake zone and a small transition region is provided between the interior of the cylinder at the intake zone and its junction with the feed opening zone. Up to now these have been the considerations that the art found necessary for a high rate of flow of the material into and through the intake zone (see Schenkel, pages 104–113).

Analytic investigations have also suggested that a high rate of displacement through the intake zone for a given rotary speed of the worm, in particular, depends upon a high thread height, a low coefficient of fraction of the worm surface, a high coefficient of friction of the inner wall of the cylinder and accommodation of the pitch angle to the effective value of the friction coefficient. Grooves have been avoided in the intake zone heretofore because they were believed to reduce displacement efficiency, especially with greater depths of such grooves.

To increase the flow through the intake zone, it is known in practice to provide the feed opening with additional pockets which are more or less of crescent shape and which are formed in the housing.

While they have been found to be helpful in some cases, by and large these earlier proposals have not been satisfactory, especially when there is a feedback of pieces of the synthetic resin to the worm.

OBJECTS OF THE INVENTION

It is the principal object of the present invention to provide an improved synthetic resin or screw press which is more efficient and has greater output and which is particularly effective for use with varying granule sizes and structures and which is especially effective when utilized together with the recycling of pieces of the synthetic resin.

Another object of this invention is to provide an improved synthetic resin worm or screw press whereby the disadvantages of the earlier systems mentioned are obviated.

SUMMARY OF THE INVENTION

I have now found surprisingly that it is possible to improve the throughput of the intake region of a synthetic resin worm press of the type described, particularly, when the latter is used for feedback in a manner which will be described, of synthetic resin which has been extruded, if one provides a reduced thread height or depth in the intake zone and, more specifically, a thread height or depth which is less by a factor of 0.5 to 0.9 than the thread height (or depth) in the feed opening zone. In addition it is essential to the invention that, at the transition between the feed opening zone and the intake zone, the worm core have a frustoconically divergent portion, i.e. a portion of progressively increasing diameter in the direction of flow of the synthetic resin material.

It is a further essential feature of the invention that at least in the region of the transition and preferably extending therefrom into the intake zone, the wall of the cylinder is provided with at least one and preferably a plurality of longitudinally extending grooves opening into the interior of the cylinder and having a progressively descreasing depth in the flow direction.

What is most surprising is that, while the synthetic resin worm press according to the invention is constructed generally of the configuration and diameter dimensions of conventional screw presses, by comparatively slight modifications of the form in the three particulars mentioned, i.e. with respect to the thread height relationship between the feed opening and the intake zones, the shape of the transition region, and the longitudinal grooves, a vast improvement in the amount of material which can be induced to move from the feed opening zone through the intake zone can be obtained for a given speed of the worm, thread pitch, external diameter and thread height and root diameter in the feed opening zone.

At least from the feed opening zone through the intake zone, the worm can be formed as a single thread worm.

According to another feature of this invention, however, upstream of the feed opening zone, i.e. adjacent the feed opening zone but at the end thereof opposite the end toward which the material is displaced by rotation of the worm a portion of the housing defines a feedback zone into which the worm extends, the feedback zone of the worm being provided as a double thread. This feedback zone receives pieces of the synthetic resin material, e.g. pieces of a shaped product or wastes otherwise generated, and forces the feedback material into the feed opening zone for intimate mixture with fresh material supplied through the hopper communicating with the latter zone and the resulting mixture is advanced to the intake zone. The multiple thread in the feedback zone preferably has the same thread height as the single thread in the feed opening zone.

The feedback zone can be provided with a simple opening or hopper for introduction of the recycled material or a transverse worm may be supplied to feed the recycled material into the feedback zone.

It is also possible for the second thread of the double thread of the worm in the feedback zone to extend into the feed opening zone.

I have found, moreover, that it is important to the present invention that the core of the worm define an annular clearance of a radial width $d_1$ with the surrounding wall of the cylindrical housing beyond the aforementioned grooves which defines a certain relationship with the annular clearance of a radial width $d_2$ between the core and the wall upstream of the grooves and particularly wherein these radial widths are in a ratio $d_1/d_2$ of substantially 6/9.

Another parameter I have found to be important is the length of the intake zone which should be about 6D where D is the external diameter of the worm, i.e. the pitch diameter, or the interior of the cylinder in which the worm rotates.

Under these conditions, all other things being equal and with worms operating at the same speed, I can improve the throughput of the intake zone for the same rpm by about 25% over that obtainable with prior art worms.

BRIEF DESCRIPTION OF THE DRAWING

The above and other objects, features and advantages of the present invention will become more apparent from the following description, reference being made to the drawing accompanying in which:

FIG. 3 is a view similar to FIG. 1 but illustrating another recycling inlet for feedback material; and FIG. 4 is a detail view from above of the recycle inlet.

SPECIFIC DESCRIPTION

Figure 1:
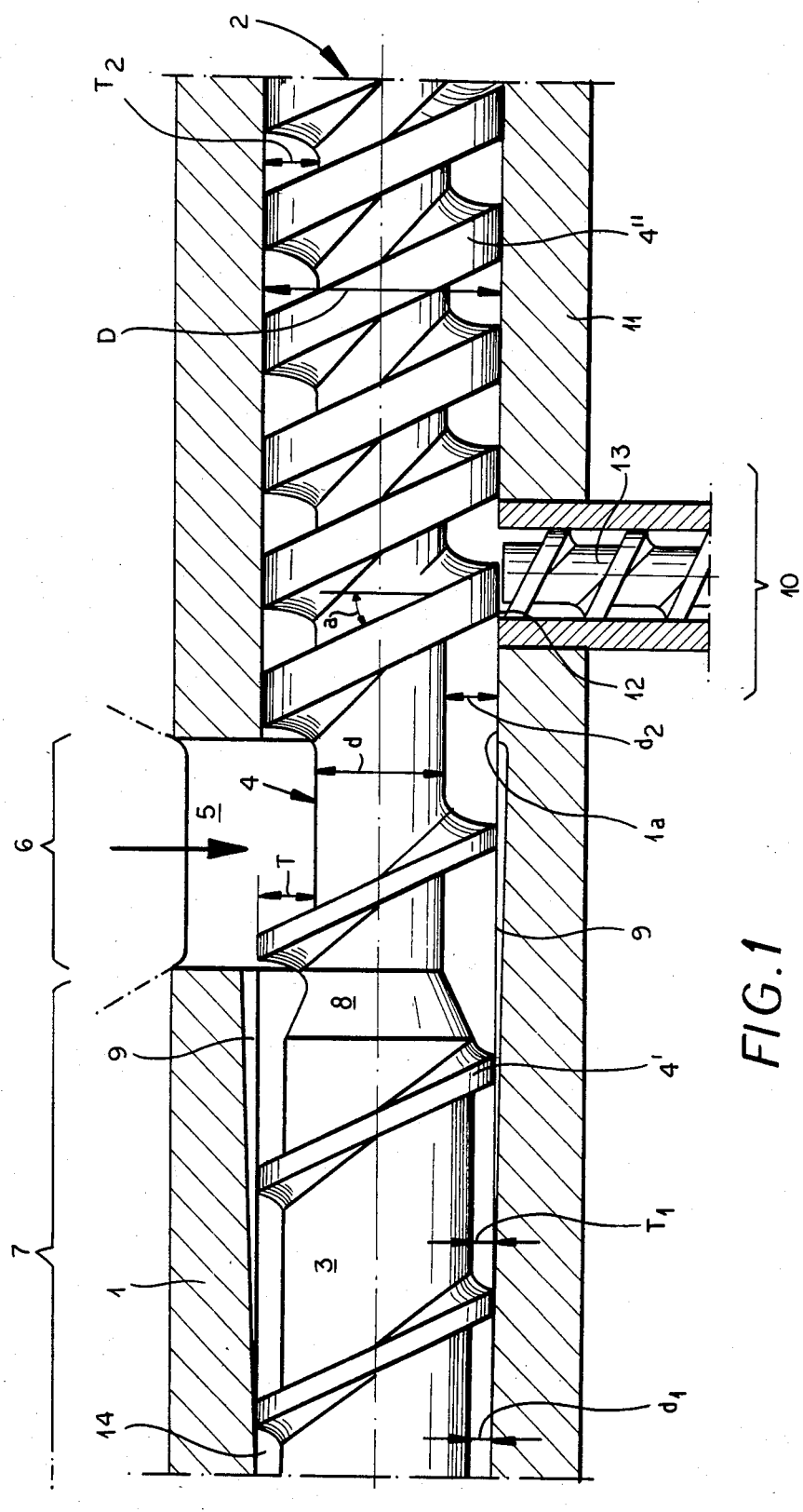
FIG. 1 is a fragmentary axial section through a synthetic resin press worm according to the invention.

Referring initially to FIG. 1 it may be seen that the synthetic resin worm press of the invention can comprise a cylindrical housing 1 and a worm 2 which is rotatable in this housing by a driving means coupled thereto at its right-hand end and not illustrated in the drawing.

The outlet end of the worm and the various zones between the portions illustrated and the outlet end have not been illustrated either and it will be understood that the pitch of the worm may be varied along its length so as to generate the required degree of compression, shear and mastication effects which result in the plastification of the synthetic resin material so that it can be extruded in liquid form for film, blow molding or tube extrusion or even for feeding to an injection molding machine or the like.

The worm 2 comprises a worm core 3 and at least one thread or flight 4', 4" extending helically along the worm and rising from the core. The thread height generally is represented at T and may also be represented as the thread depth. The thread height T is, of course, equal to one half the different between the outer diameter D of the worm and the root diameter d thereof at the region the measurement is taken.

It is conventional to modify the thread height T along the length worm so that the desired degree of compression is obtained. This also applies to variations of the pitch angle a which, as illustrated, is measured between the flank of the flight or thread and a radial plane through the worm. However it is also the common practice to provide the intake zone 7 which adjoins a feed opening zone 6 of a conventional worm so that the thread height is the same in both.

The housing 1 is formed with a filling opening 5 the axial dimension of which defines the filling opening zone 6. Directly adjacent the filling opening zone at the downstream side thereof, is an intake zone 7 which draws the synthetic resin material introduced into the feed opening zone 6 along the worm.

According to the invention and in the best mode embodiment thereof, a single thread flight 4' extends with a fixed pitch angle a through the feed opening zone 6 and the intake zone 7, the thread height T in the feed opening zone differs from that in the intake zone and indeed so that the thread height $T_1$ in the intake zone is smaller by a factor of 0.5 to 0.9 than the thread height T.

In addition, the worm core 3 has a transition region 8 at the junction of the feed opening zone with the intake zone and this transition region is formed as a conically divergent piece widening in the direction of flow, i.e. to the left.

The inner wall 1a of the housing is, moreover, provided with longitudinally extending grooves 9 at least from the transition region and preferably also reaching into the feed opening zone and which are of decreasing depth in the flow direction.

In the embodiment of FIG. 1, upstream of the feed opening zone 6, I provide a feedback or recycling zone having an inlet region 10 to which pieces of the synthetic resin material are returned to the extrusion press. At this end the cylinder housing 1 is extended rearwardly at 11 and is provided with a lateral inlet opening 12 for the recycling of pieces of the synthetic resin material. A worm 13 can feed laterally through this opening to meter the recycled synthetic resin to the portion 4" of the worm 4 which is constituted with a double thread having the same pitch angle a as the single thread 4' of the worm. The root diameter of the worm in this region is the diameter d and hence the thread height $T_2$ is equal to the thread height T.

Figure 2:
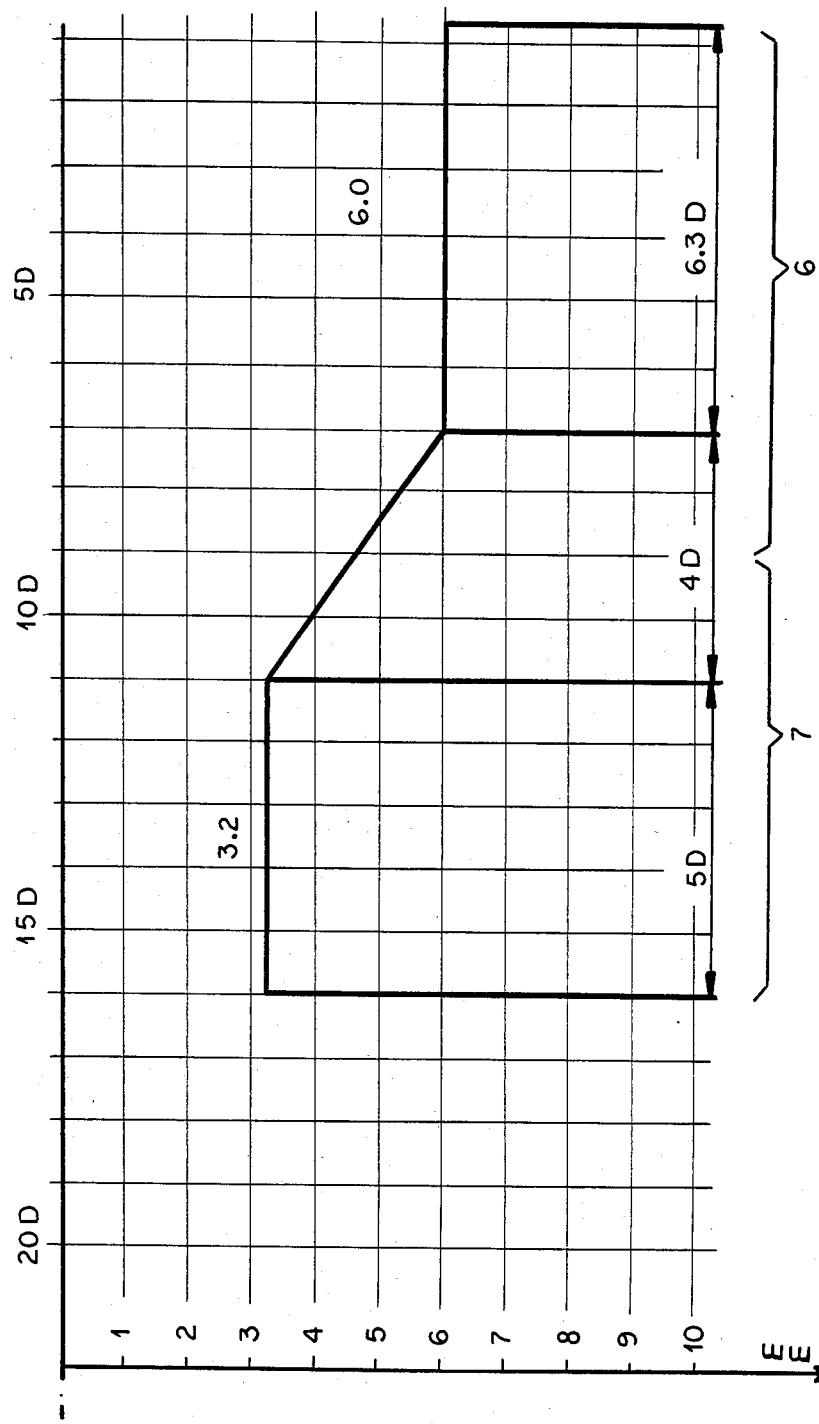
FIG. 2 is a graphic diagram illustrating the characteristics of the worm.

FIG. 2 graphically depicts the annular gap width plotted along the ordinate in millimeters versus axial distance along the worm plotted in units of the outer diameter D for the zones 6 and 7, showing the transition zone at which they join one another.

From this diagram it will be apparent that the core 3 in the intake zone 7 defines a gap width $d_1$ which is related to the gap width $d_2$ in the filling opening region 6 and in the recycle region 10 such that the ratio $d_1/d_2$ is about 0.66. The length of the intake zone 7 approximates 6D and the diagram illustrates the conically widening transition piece 8 as well as the grooves.

The embodiment of FIGS. 3 and 4 differs from that of FIG. 1 only in that the lateral inlet opening 12' is formed as a slot without a feed worm and is provided with a hopper for the recycled material.

I claim:

1. A synthetic resin worm press comprising:
   a cylindrical housing formed with a substantially cylindrical bore defined by a wall;
   a feed opening formed in said wall, said feed opening communicating with said cylindrical bore over a portion of the length of the worm press, said feed opening defining a feed opening zone only over the length of said feed opening, the press having an intake zone immediately adjoining said feed opening zone in a direction of flow of synthetic resin material through said bore; and
   a worm rotatable in said cylindrical bore to displace synthetic resin material introduced into said feed opening zone along said cylindrical bore in said direction of flow,
   said worm having at least one helical thread rising from a worm core where said helical thread extends along said worm through said feed opening and intake zones, the thread height along said intake zone being smaller than the thread height along said feed opening zone by a factor of 0.5 to 0.9,
   said worm core being provided immediately adjacent said feed opening zone, said worm core, extending into said intake zone with a transition piece conically diverging in said direction of flow, and
   said wall being formed with a plurality of longitudinally extending rectilinear grooves opening into said cylindrical bore at said feed opening and intake zones and of a progressively decreasing depth in said direction of flow, said grooves beginning at said feed opening zone at a deepest portion, extending the full length of said feed opening zone, and terminating at said intake zone beyond said transition piece in said direction by merging into a surface of said wall of the diameter of said bore.

2. The press defined in claim 1 wherein said worm is provided with a single thread in said feed opening and intake zones.

3. The press defined in claim 1 wherein said cylindrical housing is formed with an extension connected to said feed opening zone rearwardly thereof with respect to said direction of flow, said extension having at least one opening adapted to receive recycled synthetic resin material, said worm having at least one thread in said extension for advancing recycled material into said feed opening zone.

4. The press defined in claim 2 wherein said cylindrical housing is formed with an extension connected to said feed opening zone rearwardly thereof with respect to said direction of flow, said extension having at least one opening adapted to receive recycled synthetic resin material; said worm having at least one thread in said extension for advancing recycled material into said feed opening zone.

5. The press defined in claim 3 wherein the thread height of the thread in said extension is equal to the thread height of the thread in said feed opening zone.

6. The press defined in claim 5 wherein said worm is formed with a double thread in said extension.

7. As defined in claim 6 wherein said double thread extends into said feed opening zone.

8. The press defined in claim 6 wherein a further worm communicates with said extension for delivering said recycled material thereto.

9. The press defined in claim 1 wherein said worm core defines with said wall an annular gap of a radial width $d_1$ in said intake zone and said worm core defined with said wall an annular gap of radial width $d_2$ in said feed opening zone, the ratio $d_1/d_2$ being substantially 6/9, the length of said intake zone being substantially 6D where D is the outer diameter of said worm.

10. The press defined in claim 3 wherein said worm core defines with said wall an annular gap of a radial width $d_1$ in said intake zone and said worm core defined with said wall an annular gap of radial width $d_2$ in said feed opening zone, the ratio $d_1/d_2$ being substantially 6/9, the length of said intake zone being substantially 6D, where D is the outer diameter of said worm.

* * * * *